United States Patent
Nader et al.

(10) Patent No.: US 12,496,111 B2
(45) Date of Patent: Dec. 16, 2025

(54) PLATE INSERTER TOOL

(71) Applicant: Medline Industries, LP, Northfield, IL (US)

(72) Inventors: Samuel Nader, Arlington Heights, IL (US); Dinesh Koka, Winter Park, FL (US); Natan Pheil, Highland Park, IL (US)

(73) Assignee: Medline Industries, LP, Northfield, IL (US)

( * ) Notice: Subject to any disclaimer, the term of this patent is extended or adjusted under 35 U.S.C. 154(b) by 163 days.

(21) Appl. No.: 18/242,056

(22) Filed: Sep. 5, 2023

(65) Prior Publication Data

US 2025/0072945 A1 Mar. 6, 2025

(51) Int. Cl.
*A61B 17/80* (2006.01)
*A61B 17/56* (2006.01)

(52) U.S. Cl.
CPC ...... *A61B 17/808* (2013.01); *A61B 2017/564* (2013.01)

(58) Field of Classification Search
CPC . A61B 17/808; A61B 17/8085; A61B 17/809; A61B 17/8095; A61B 2017/04888; A61B 17/7076; A61B 17/0682; A61B 17/128
See application file for complete search history.

(56) References Cited

U.S. PATENT DOCUMENTS

| | | | |
|---|---|---|---|
| 9,597,131 B2 | 3/2017 | Price | |
| 10,898,247 B2* | 1/2021 | Perrow | A61B 17/808 |
| 10,945,725 B2* | 3/2021 | Hollis | A61B 17/0642 |
| 2005/0085824 A1 | 4/2005 | Castaneda | |
| 2011/0106086 A1 | 5/2011 | Laird | |
| 2013/0289626 A1 | 10/2013 | Murashko, Jr. | |
| 2016/0045238 A1 | 2/2016 | Bohay | |
| 2016/0346022 A1 | 12/2016 | Price | |
| 2018/0242987 A1 | 8/2018 | Lintula | |
| 2019/0069892 A1* | 3/2019 | Biedermann | A61B 17/0682 |
| 2023/0060073 A1 | 2/2023 | Niver | |

OTHER PUBLICATIONS

Arthrex, Arthrex Calcaneal Fracture System brochure, 2020.
Arthrex, Calcaneal Fractures Innovative Treatment Solutions brochure, 2019.

(Continued)

*Primary Examiner* — Anu Ramana
(74) *Attorney, Agent, or Firm* — Fitch, Even, Tabin & Flannery LLP

(57) ABSTRACT

Disclosed is plate insertion tool useful with bone plates having a body and a pair of retainers, such as facing, inwardly extending fingers, for clamping a bone plate therebetween, and a pusher movable relative to the body between a fully disengaged position and a fully engaged position, the pusher in use engaging a shoulder of the compression plate. When the pusher is in an engaged position, the legs of the plate are temporarily tensioned by bending the legs away from the body of the plate. The body of the tool includes a pivot joint about which said pusher pivots. The tool may be used to temporarily tension the legs of the plate prior to insertion into holes in a bone.

16 Claims, 18 Drawing Sheets

(56) References Cited

OTHER PUBLICATIONS

CoLink Cfx—In2Bones, Comprehensive Low-Profile Calcaneal Fixation System, https://i2b-usa.com/colink-cfx/, printed Aug. 11, 2022.
Coventus, Calcaneus Plate System Surgical Technique Guide brochure, 2021.
Medline Industries, LP, Unite Food & Ankle, Calcaneal Fracture Plating System brochure, 2022.
NEWCLIP Technics, Calcanheal Foot Trauma Solutions, 2021.
Paragon28, Inc., Gorilla Calc Fracture Plating System Product Information brochure, 2020.
Paragon28, Inc., Gorilla Calc Fracture Plating System, Surgical Technique Guide, 2020.
Zimmer Biomet, A.L.P.S.™ Minimally-Invasive and Mesh Calcaneus Plating System brochure, date unknown.

* cited by examiner

PLATE INSERTER TOOL

FIELD

The disclosure relates to an apparatus and method for joining or fusing two bones together and especially for attaching to the bones a plate having legs at one end portion and at least one opening for bone screws at an opposite end portion.

BACKGROUND

Screws are commonly used for joining or fusing two bones or bone pieces together. The screw or screws may cross a joint, fracture or osteotomy. For example, screws can be used to fuse metatarsal phalangeal joints to relieve pain or correct deformity. Screws also can be used in a Lapidus procedure to fuse the joint between the first metatarsal bone and the medial cuneiform.

Instead of screws, fusions can be made using one or more plates. In one form, plates have legs at one end and screw holes at another end. A spreader tool can abut the legs to bend the legs from an acute angle to a large angle by pushing against an opening in the body of the plate. Disadvantageously, such a spreader tool can require specialized openings in the body for receiving part of the tool. Moreover, unnecessary openings in the body beyond those necessary for receiving the screws can weaken the body. Further, the requirement that the spreader tool contacts the opposite ends of the plate can limit the designs of plates that can be used with such a tool.

The plate insertion tools and methods described herein can address these problems. Generally, a plate insertion tool includes a body, a pair of plate retainers at least one of which is movable with respect to the body over a range of travel between a clamping position and a fully open position, and a pusher movable relative to the body over a range of travel between a fully disengaged position and a fully engaged position, the body having a pivot joint about which said pusher pivots. In use, the plate retainers clamp a portion of a compression plate therebetween. The compression plate includes at least one leg and preferably a pair of legs separated by a shoulder. The pusher engages the compression plate such that, when the pusher moves towards the fully engaged position, the at least one leg of the plate is temporarily tensioned by bending the leg away from the plate body. The plate may be used to position a plate, such as a plate made of a nitinol alloy or another shape memory material, in position over the bone of a patient with the legs of the plate tensioned relative to the body of the plate. The leg or legs can be inserted into pre-drilled holes in the patient's bone. Upon disengagement of the plate and insertion tool, the legs will exert a compressive force to aid in bone healing. The insertion tool optionally can be provided in the form of a kit that includes a bone plate and optionally other components. Also provided are assemblies of a tool and bone plate.

DETAILED DESCRIPTION

Figure 1:
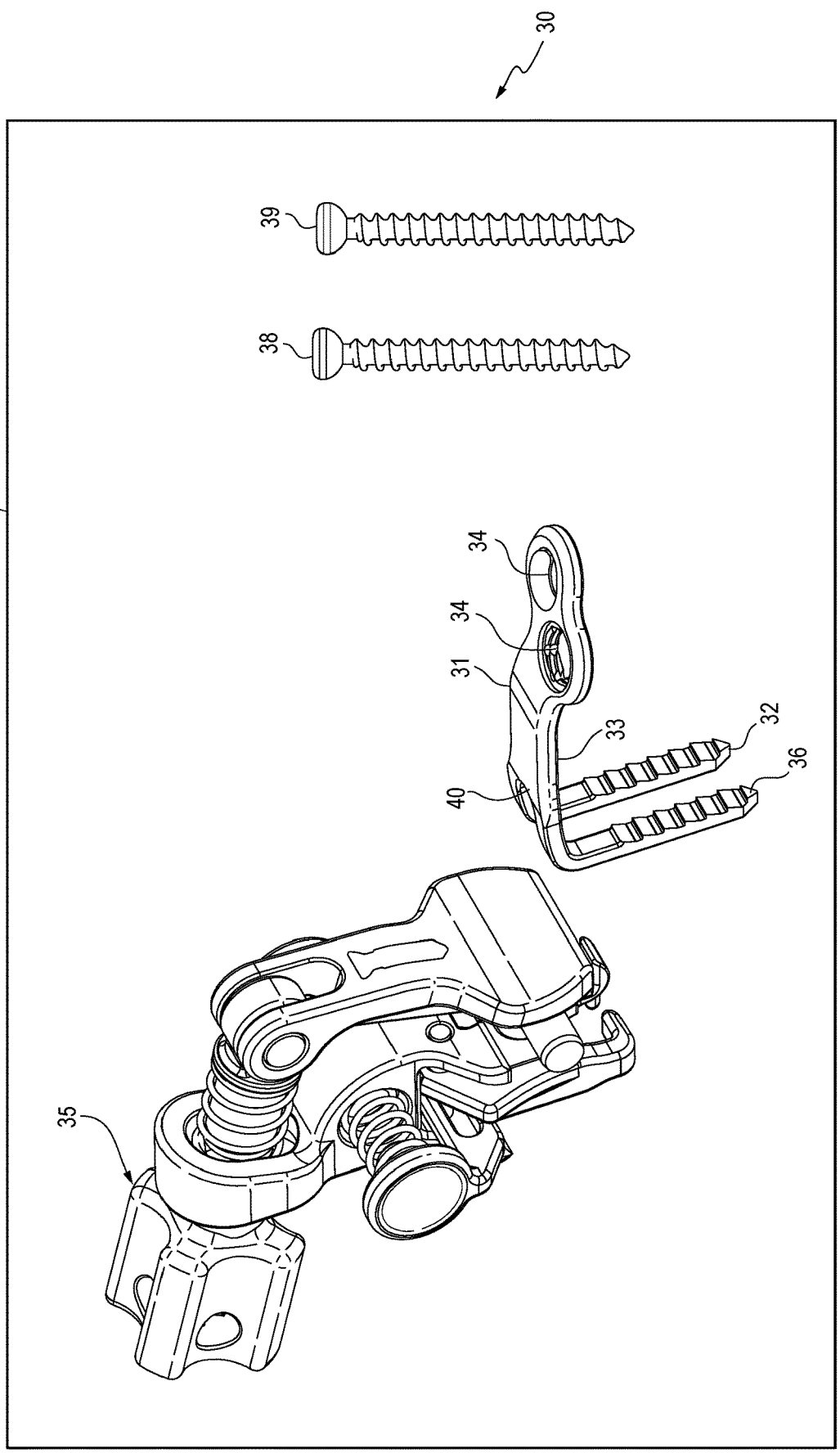
FIG. 1 is perspective view of a kit including a bone plate and a bone plate insertion tool and two bone screws.
Figure 2:
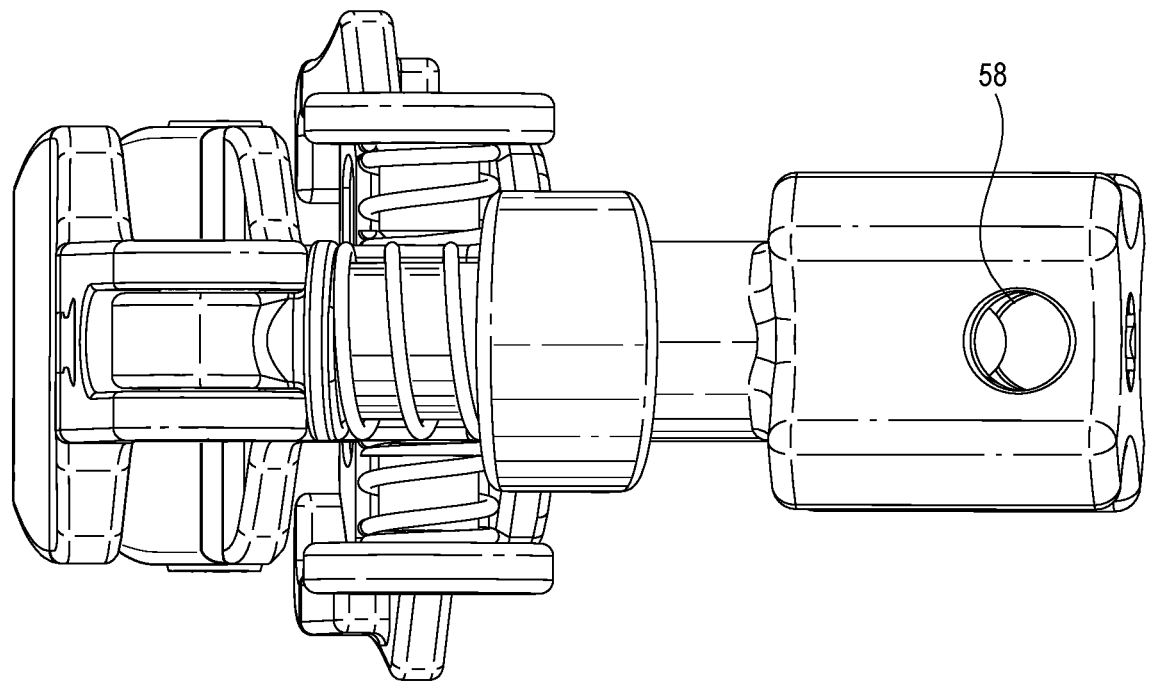
FIG. 2 is a top plan view of the plate insertion tool shown in FIG. 1.

Generally, the kit 30 shown in FIG. 1 includes a bone plate insertion tool 35, a bone plate 31, and bone screws 38, 39 disposed within container 41. The bone plate 31 has a plate body portion 33 with one or more apertures or screw holes 34 each for receiving a screw 38, 39. The bone plate 31 further includes at least one leg, and preferably a pair of legs 32, 36 side-by-side at one end that are each connected to the body portion 33 at an acute angle relative to the major plane thereof at the junction of the legs and plate, and that are spaced apart by a shoulder 40. The plate is made of a nitinol alloy or other shape memory material. Because the bone plate 31 is a single-patient item and the tool 35 is durable and intended for re-use, the kit may be assembled in situ by the surgeon or by a medical team prior to surgery. The kit may include other components (not shown) useful in a surgical procedure.

Figure 3:
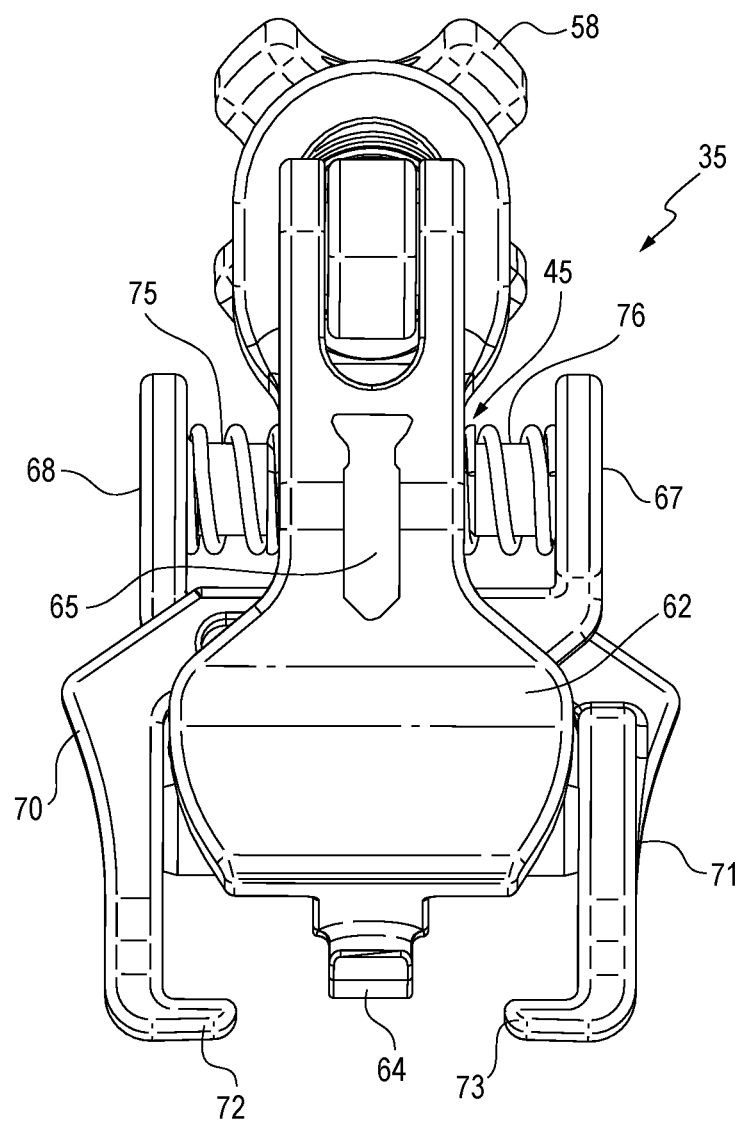
FIG. 3 is a front elevation of the plate insertion tool shown in FIG. 1.
Figure 4:
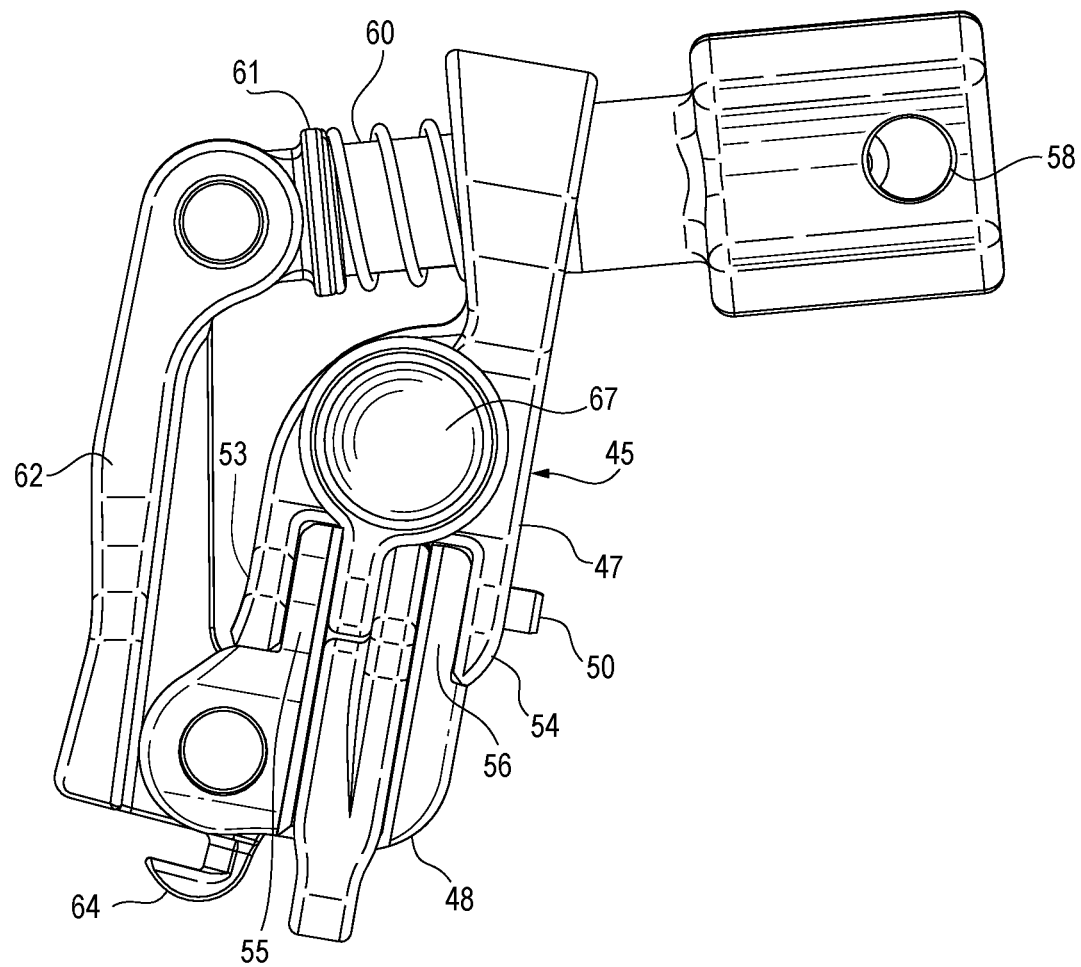
FIG. 4 is a left side elevation of the plate insertion tool shown in FIG. 1.
Figure 5:
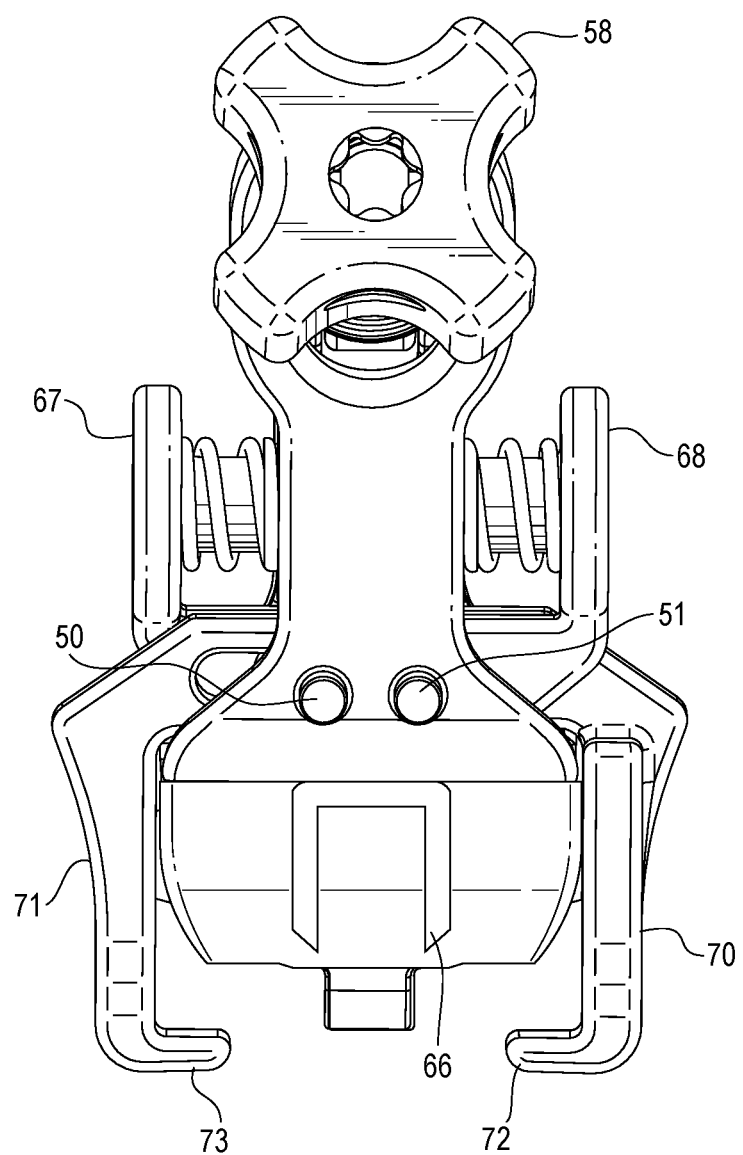
FIG. 5 is a rear elevation of the plate insertion tool shown in FIG. 1.

With various reference to FIGS. 2-8, the bone plate insertion tool 35 includes a two-part body 45 that includes an upper body part 47 and a lower body part 48 secured respectively to one another via dowel retention pins 50, 51, the upper body part 47 having extensions 53, 54 that slide over respective extensions 55, 56 in lower body part 48 (shown in FIG. 4) and that include coaxial openings for the retention pins 50, 51. The tool includes an operator handle 58, a spring loaded shaft 60 operating in conjunction with compression spring 61, and a linking member 62 that terminates in a pusher 64, the pusher 64 taking the form of a hook-like structure. The body 45 further includes actuators 67, 68 integral with arms 70, 71 that terminate respectively in facing, inwardly extending fingers 72, 73. The arms are biased outward, and hence the fingers are biased inward, via first and second nested compression springs 75, 76 (FIG. 3). A laser-etched orientation indicium 65 (FIG. 3) is provided to indicate that the front of the device should face the side of the plate with screw holes, and a similar orientation indicium 66 (FIG. 5) is provided on the read of the device to indicate that this side of the device should face the side of the plate with staple legs.

Figure 6:
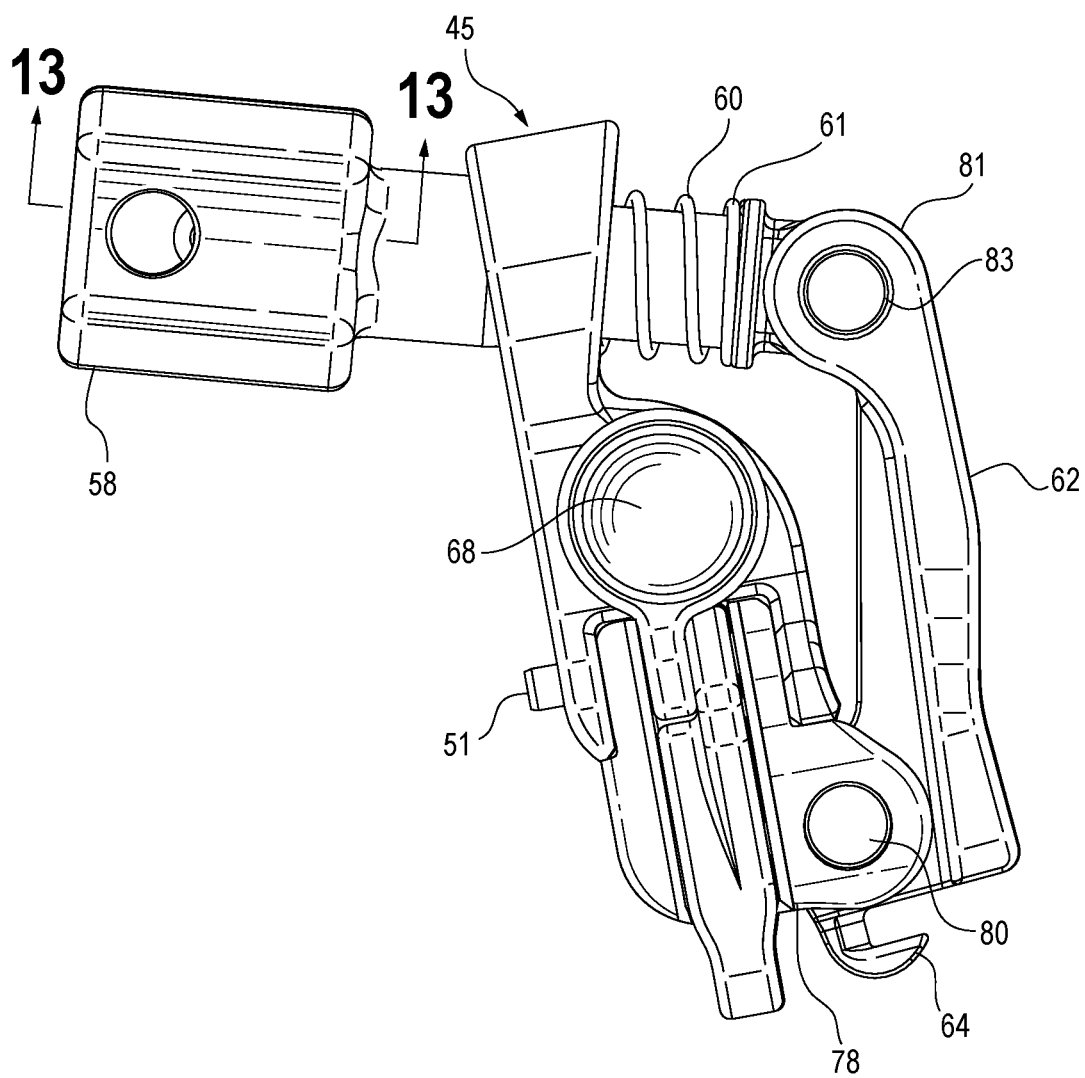
FIG. 6. is a right side elevation of the plate insertion tool shown in FIG. 1.
Figure 7:
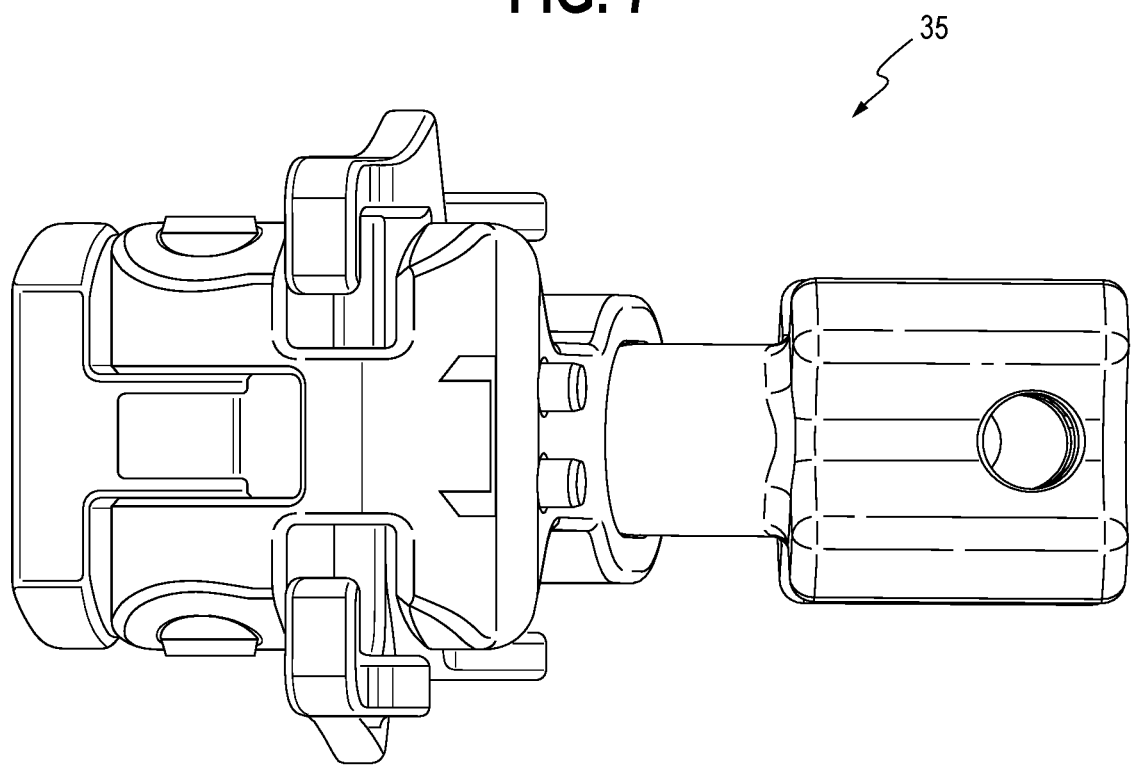
FIG. 7 is a bottom plan view of the plate insertion tool shown in FIG. 1.
Figure 8:
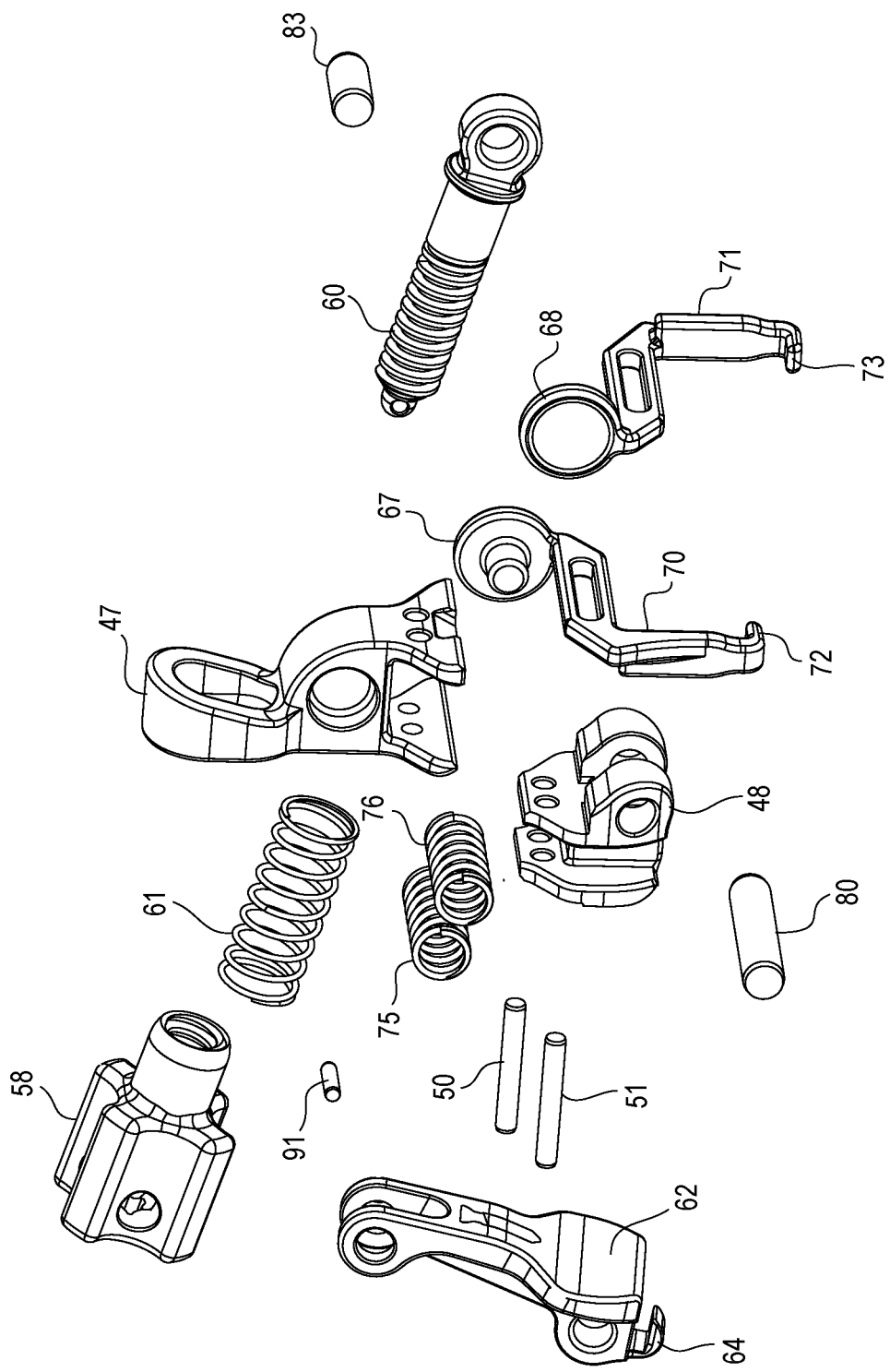
FIG. 8 is an exploded view of the plate insertion tool shown in FIG. 1.
Figure 9:
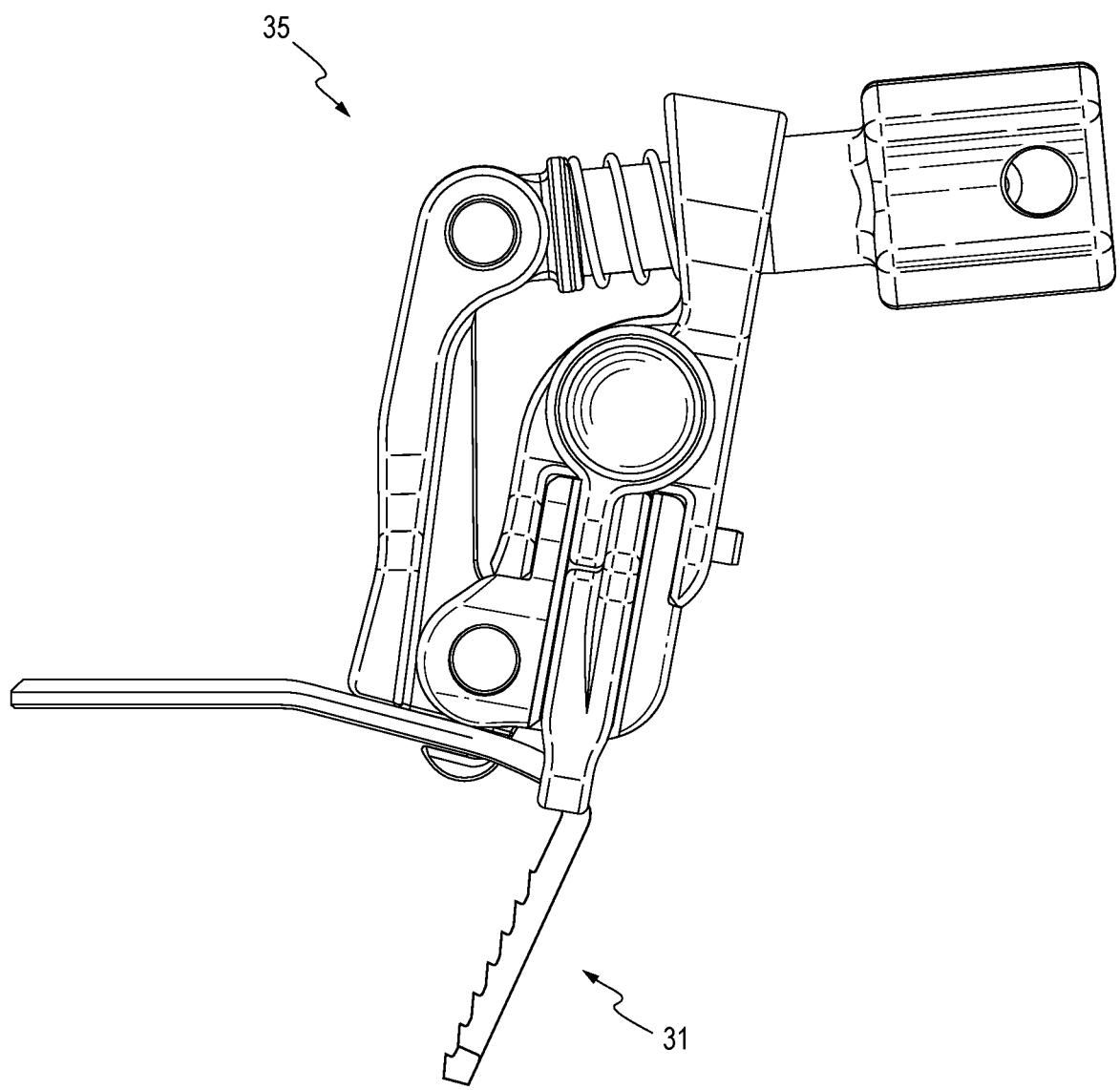
FIG. 9 is a side elevation of an assembly of the plate insertion tool and a bone plate showing initial loading of a bone plate, the tool being in a non-tensioned state and the actuators being manually depressed to permit loading of the plate.
Figure 16:
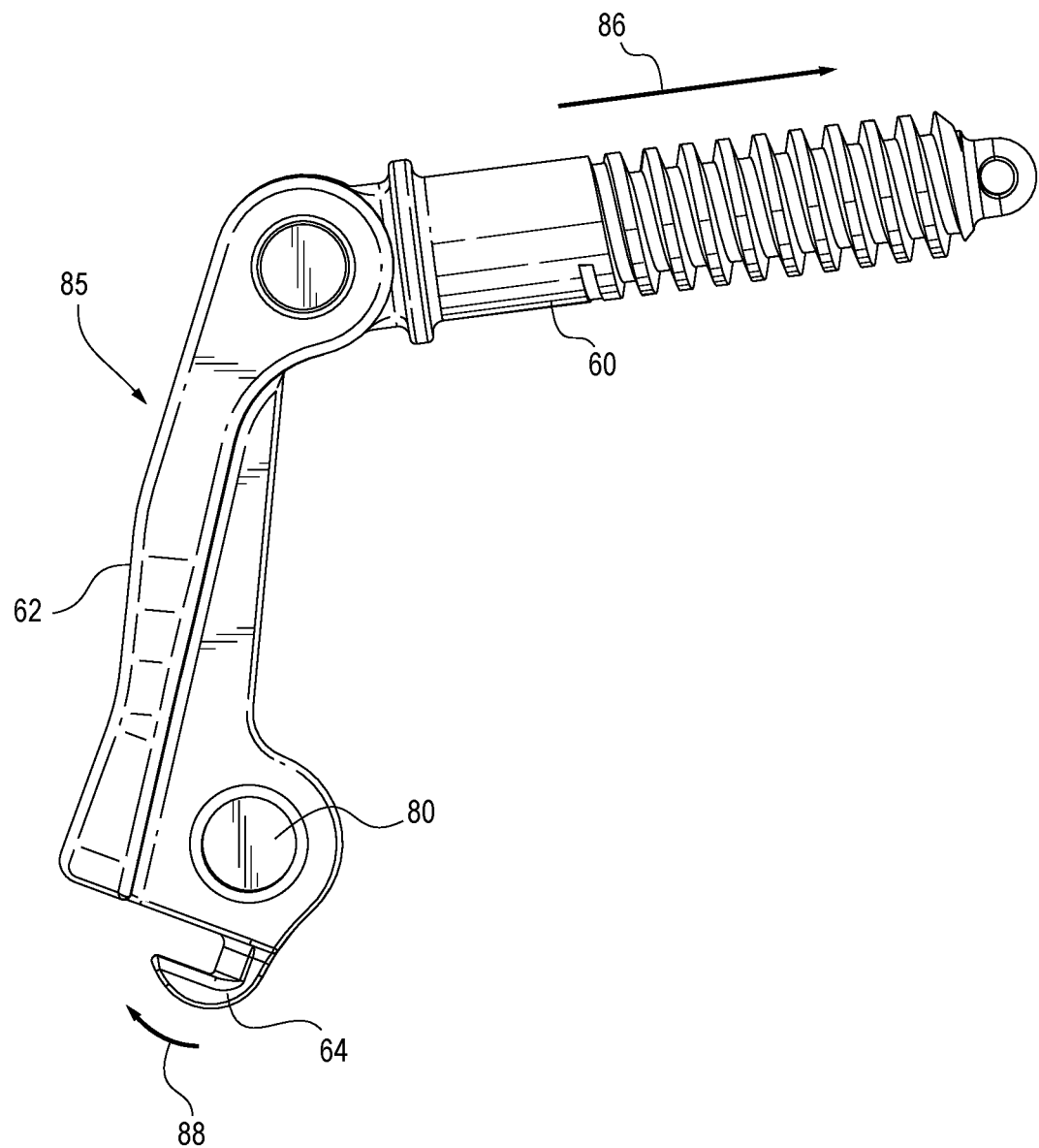
FIG. 16 is a side elevation of the shaft, linking member, and pivot pins of the plate insertion tool depicted above.
Figure 17:
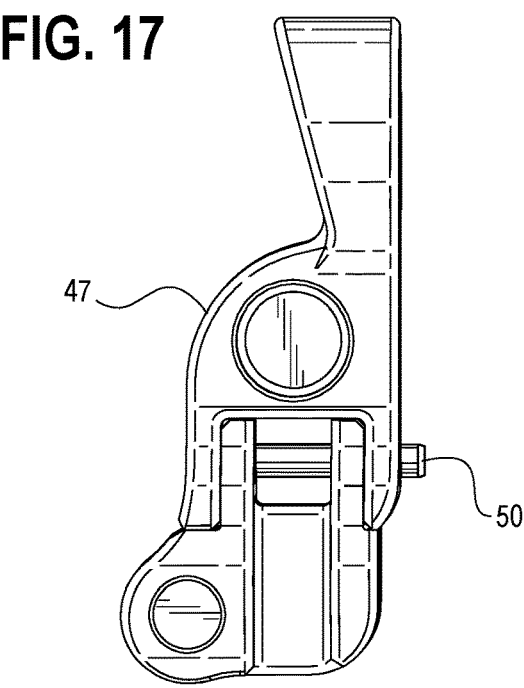
FIG. 17 is a left side elevation of a first subassembly of the plate insertion tool shown above that includes the first and second body portion and retention dowel pins.
Figure 18:
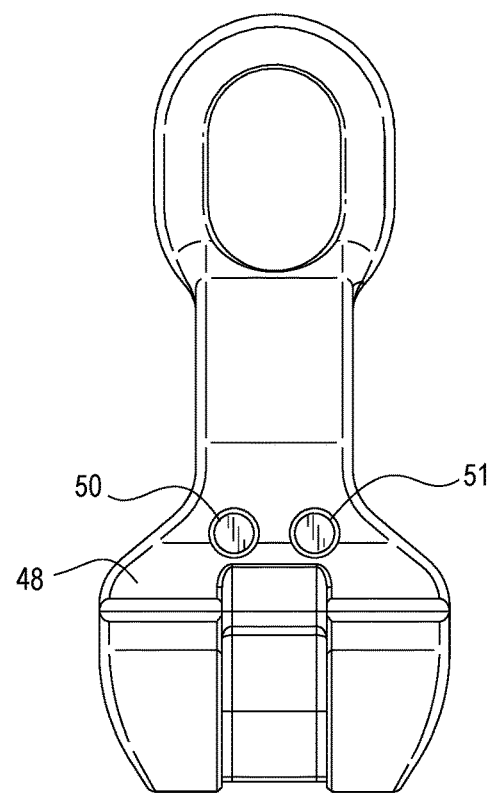
FIG. 18 is a front elevation of the subassembly shown in FIG. 18.
Figure 19:
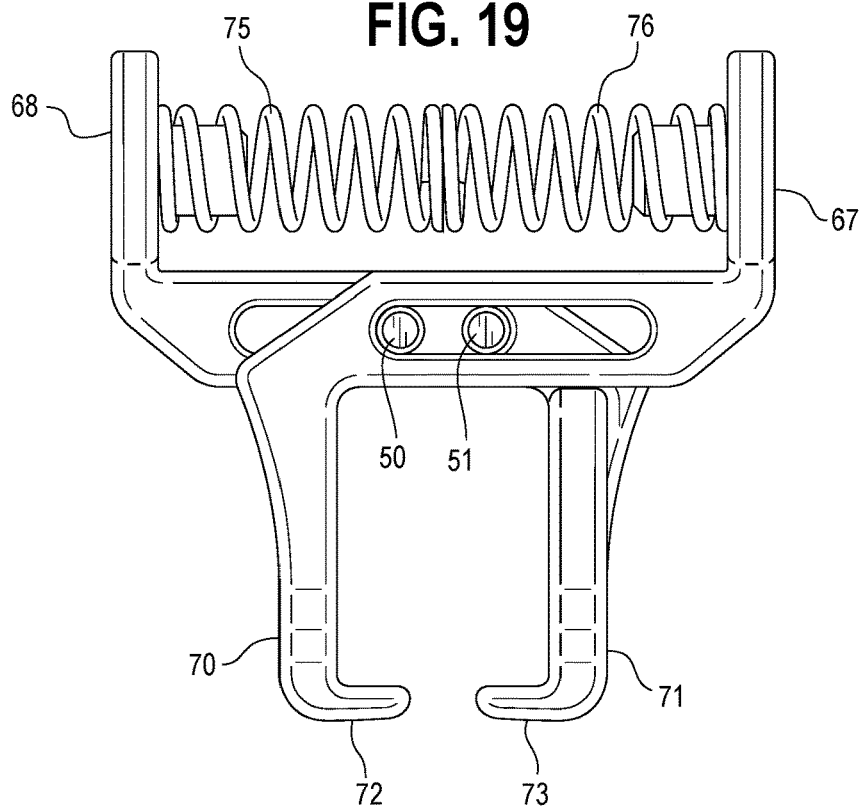
FIG. 19 is a front elevation of a second subassembly of the plate insertion tool shown above that includes the first and second arm portions, retention dowels, and arm springs, shown in a clamped position.
Figure 20:
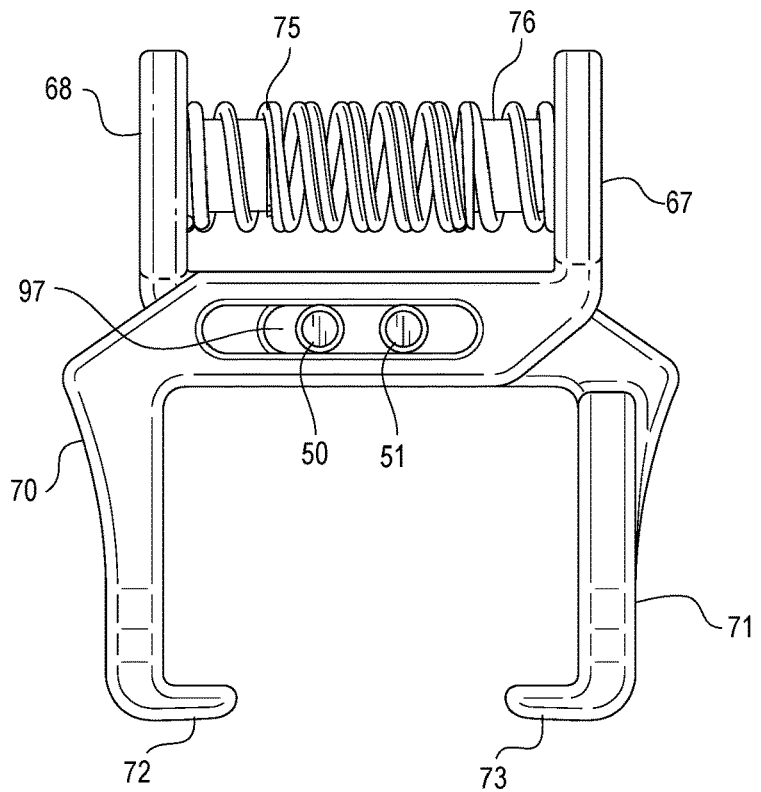
FIG. 20 is a front elevation of the second subassembly shown in FIG. 19 illustrating the arms in an unclamped position

As seen especially in FIG. 6, the body 45 has a first pivot joint 78 formed via a portion of the body and pivot pin 80 about which the pusher 64 pivots. The pusher 64 is movable over an arcuate range of travel between a fully engaged position and a fully disengaged position. An operator may actuate the pusher via turning the handle 58 as described in more detail hereinbelow. The shaft 60 is connected to the linking member 62 at a second pivot joint 81 formed via a portion of the linking member 62 and pivot pin 83. Referring to FIG. 16, the shaft 60 and linking member 62 collectively form a linkage 85 that converts translation of the shaft in the direction of arrow 86 in FIG. 16 to rotary pivoting of the pusher 64 about the first pivot pin 80, as seen via arrow 88. Here it is seen that a portion of the linking member 62 operates as a first-order lever with respect to the pusher 64.

The fingers 72, 73 respectively form plate retainers wherein at least one, and in the illustrated embodiment both, of the plate retainers are movable with respect to the body over a range of travel between a fully clamped position and a fully open position. In use, the plate retainers clamp a portion of a compression plate therebetween.

The fingers may be separated from one another via manual depression of each of the actuators 67, 68, which overcomes the outwardly directed biasing force of the springs 75, 76. The springs 75, 76, normally bias the actuators 67, 68 away from one another and thereby cause the fingers 72, 73 normally to be in the fully clamping position when there is no plate engaged. In practice, the clamping position defines the minimum separation between fingers 72, 73 and when using clamping a plate, this distance may be greater. When retaining a plate, the fingers 72, 73 will be forced together and will abut and clamp the plate via the bias generated by springs 75, 76.

Figure 10:
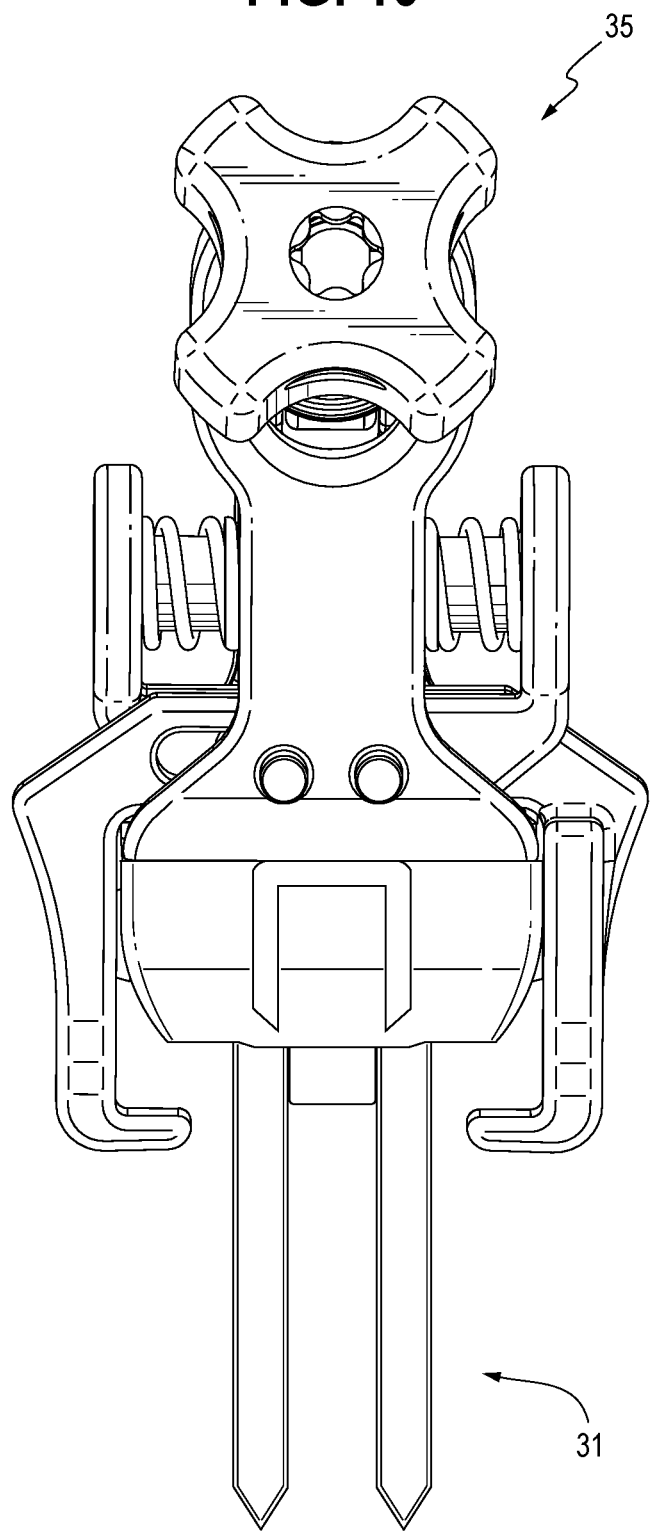
FIG. 10 is a rear elevation of the assembly shown in FIG. 9.
Figure 11:
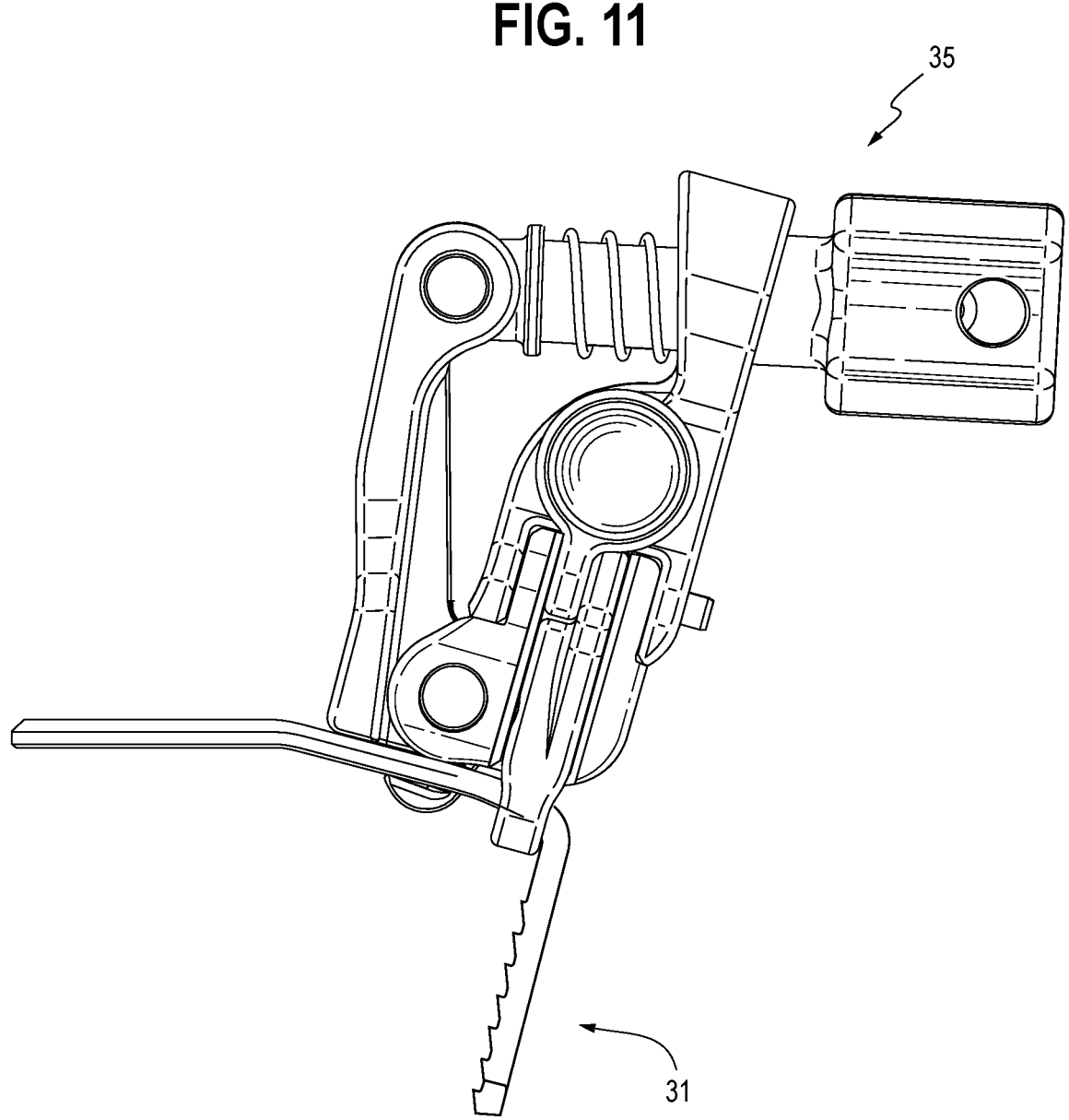
FIG. 11 is a side elevation of an assembly of the plate insertion tool and a bone plate showing the plate loaded and tensioned and with the actuators being released to clamp the plate between the plate retainers.
Figure 12:
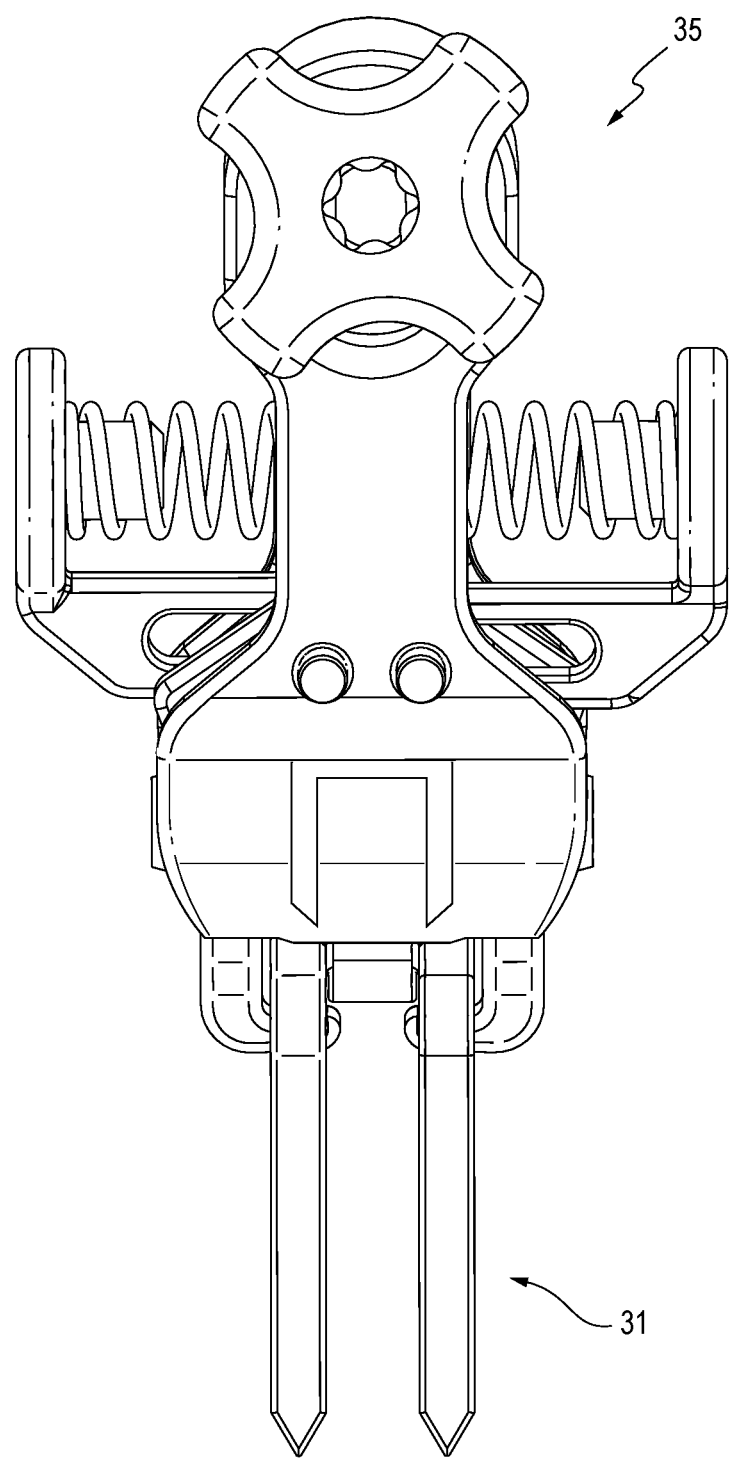
FIG. 12 is a rear elevation of the assembly shown in FIG. 11

The retainers are closer to each other in the fully clamped position as compared to the fully open position. This may be seen with reference to FIGS. 10 and 12, wherein FIG. 10 illustrates the fingers in an open position with manual pressure being applied to the actuators 67, 68 and FIG. 12 shows the fingers after release of manual pressure on the actuators.

Figure 13:
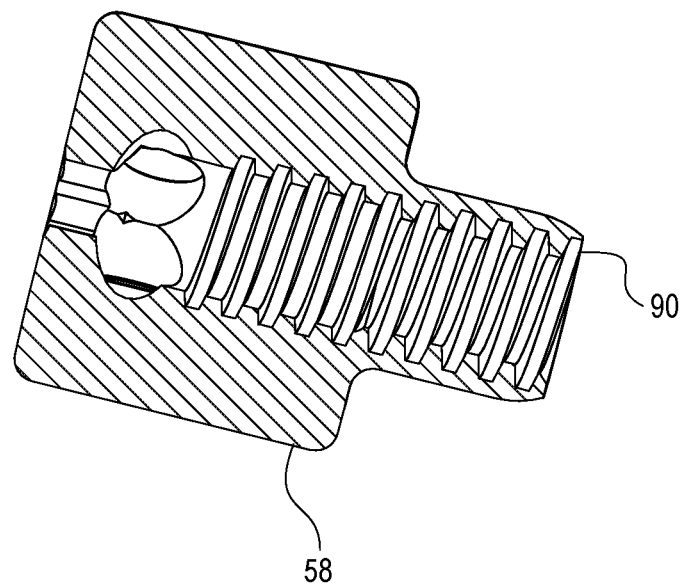
FIG. 13 is a cross-sectional view of the handle of the plate insertion tool. This view is taken along line 13-13 in FIG. 6 but omits the shaft.
Figure 14:
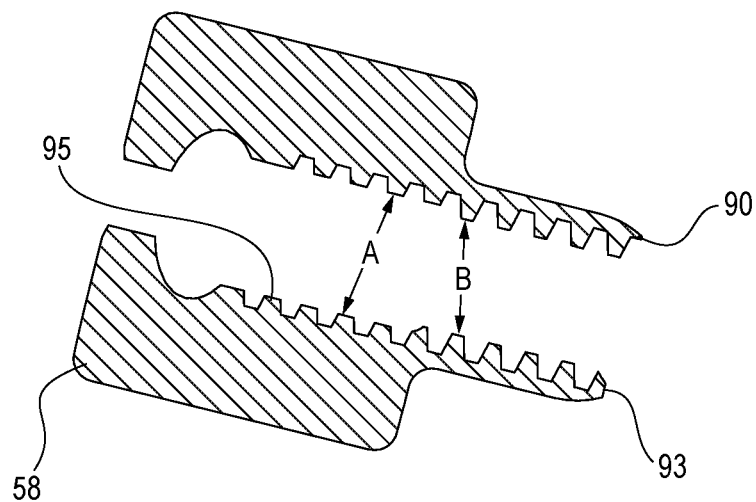
FIG. 14 is a representation of the threads of the handle shown in cross section in FIG. 13.
Figure 15:
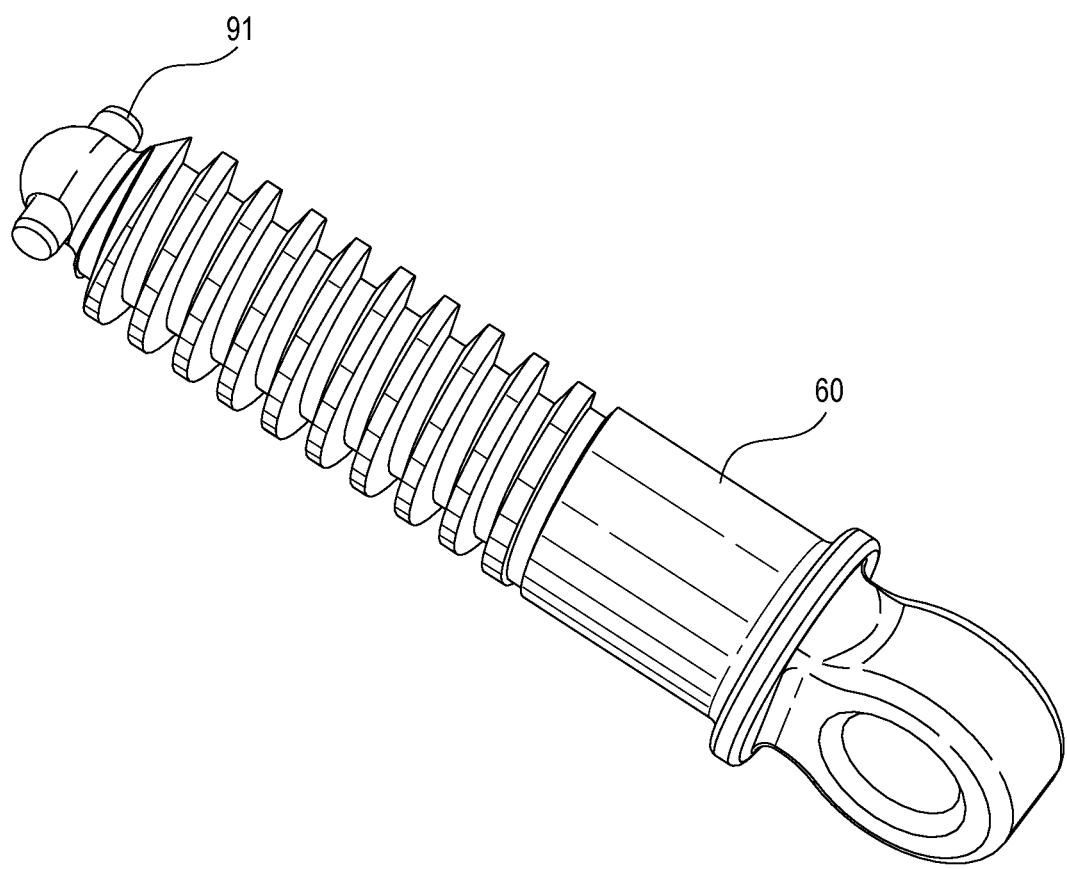
FIG. 15 is a perspective view of the leadscrew and the transverse proximal capture pin of the plate insertion tool depicted above.

As seen with respect to FIGS. 13-15, the interior of the handle 58 is threaded, as is the exterior of a portion of the shaft 60. The shaft 60 therefore operates as a leadscrew that cooperates with the internal threads 90 of the handle 58 such that rotation of the handle 58 causes the leadscrew to advance from or retract into the handle 58 and thereby to translate relative to the upper body part 47. As seen in FIG. 15, the shaft end includes a capture structure including a transverse proximal capture pin 91. This is secured to the end of the leadscrew via welding after the handle 58 has been screwed over the threaded end of the shaft 60. As seen in FIG. 14, the handle 58 has narrow distal threading 93 relative to the proximal threading 95 of the handle, whereby dimension A is radially larger than dimension B. This type of threading may be formed via tapping of the proximal region with a tool to reduce the thread height after formation of a central threaded shaft in the handle. The transverse proximal capture pin 91 is sized such that it may be accommodated within the proximal threading 95 of the handle but is occluded by the narrow distal threading 93 such that the capture pin cannot pass these threads. Via this arrangement, the handle 58 is captured on the shaft 60. Spring 61 maintains the relative positioning of the upper body part 47 relative to the handle 58 when the device is not engaged with a plate, to facilitate positioning of the device onto the plate for use.

As further seen with respect to FIGS. 17-20, the first arm and second arm 70, 71 have respective slots with overlapping area 97 which the dowel retention pins 50, 51 are disposed upon assembly. The slots are sized with respect to the dowel retention pins 50, 51 to capture the first and second arms by the body and remove rotational degrees of freedom such that the arms are slidably mounted relative to the body and to one another but cannot rotate significantly relative to the body. The dowel retention pins 50, 51 limit the range of travel of the first and second arms 70, 71. Via this arrangement, the first arm actuator and the other of the pair of inwardly extending fingers are disposed on one side of the pusher finger and the second arm actuator and the other of the one of the pair of inwardly extending fingers are disposed on an opposite side of the pusher finger.

In use, the tool 35 is placed over a bone plate 31 such as that shown in FIG. 1 and the actuators manually depressed to cause the fingers 72, 73 to engage a portion of the plate 31, typically, the legs 32, 36 depending on the size of the plate. The pusher 64 then is placed into engagement with another portion of the plate 31. The handle 58 then is rotated in a clockwise direction to cause the threaded end of the shaft 60 to retract into the handle 58, and, via action of the linkage formed by the shaft 60 and linking member 62, for the pusher 64 to abut and exert a biasing force against the engaging portion of the plate 31. Advantageously, the pusher engages a shoulder 40 formed between the legs 32, 36 of the plate 31. Via this action, as the handle is manually rotated, the tool 35 exerts a bending moment on the plate 31 to bias the legs 32, 36 of the plate away from the body of the plate, as seen in FIG. 10. The lever action of the linking member creates a mechanical advantage that in many cases will allow for manual rotation of the handle 58 while still creating substantial tension in the plate 31. In some cases, a driver or wrench (not shown) may be supplied. Preferably, the plate insertion tool only needs to contact one end portion of the plate to tension the legs, such that specific holes in the plate are not needed for the plate insertion tool to tension the legs. The plate could be made with a dedicated hole for the finger if desired.

The tool and assembly are useful in a number of surgical procedures in which the tool can be used to temporarily tension the legs prior to insertion into holes in a bone by bending or pivoting the legs away from the body. Exemplary procedures include arthrodesis of the first metatarsophalangeal joint (MTP) or 1st (Lapidus), 2nd, 3rd, 4th, and 5th tarsometatarsal (TMT) fusions, various fracture fixation, or Lisfranc fusion or stabilization, talo-navicular (TN) fusion, calcaneo-cubioid (CC) fusion, Lapidus fusion, Navicular-cuneiform (NC) fusion, Akin osteotomy, 1st, 2nd, 3rd, 4th, and TMT fusions, intercuneiform fusions, and Jones or avulsion fractures of the 5th metatarsal. Generally, the legs of a plate are inserted into pre-drilled guide holes in one of the bones, and one or more screws are inserted through the apertures and into another of the bones to secure the plate to the bones.

Figure 21:
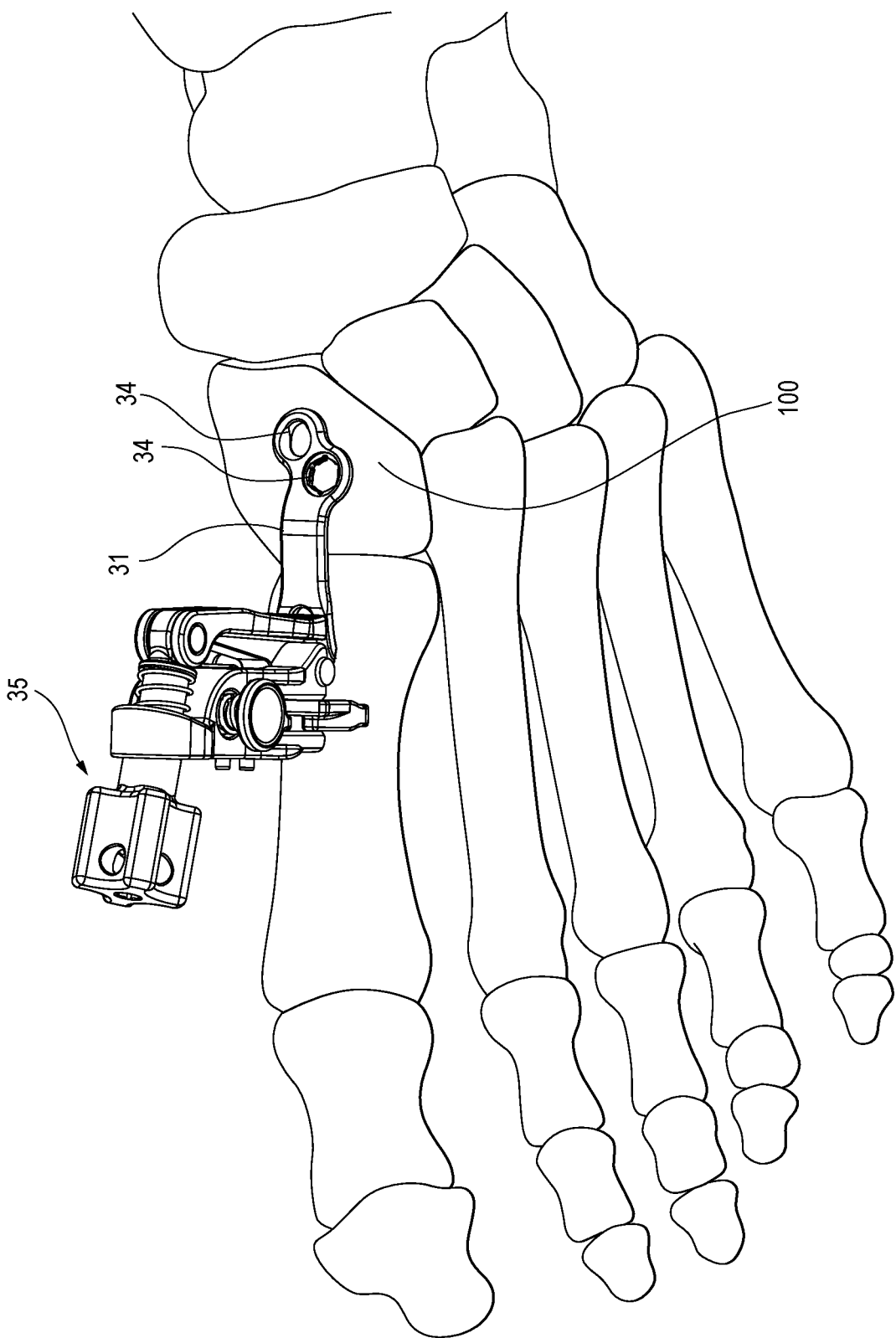
FIG. 21 is a perspective view showing placement of a bone plate on the foot of a patient in a Lapidus fusion procedure using the assembly shown in FIG. 10.

For example, with respect to FIG. 21, in a Lapidus fusion, holes are drilled in a region of the First Tarsometatarsal structure 100 for insertion of the legs of the plate 31 and for drilling optional pilot holes for bone screws. A guide (not shown) sized for the bone plate may be provided for drilling the holes. The tool 35 captures the plate and is used to tension the legs of the plate, and the legs of the plate are then inserted into the holes. Subsequently, bone screws 38, 39 (seen in FIG. 1 but not shown in FIG. 21) are screwed into the patient's bone through screw holes 34. A tensioning device (not shown) may be used to further provide temporary tension when inserting the bone screws. Use of a tensioning device is shown in U.S. Patent Publication No. 2023/0057743 A1, the entire content of which is hereby incorporated by reference. The surgeon then manually pinches the actuators 67, 68 to release the plate, releasing some tension if necessary by counter-rotating the handle 58. Via the shape memory property of the bone plate, the legs of the plate are biased toward their initial position, which again typically is an acute angle relative to the major plane of the plate at the point where these meet, to thereby exert a compressive force on the First Tarsometatarsal. This is understood to assist in bone healing.

The components may be made via any suitable technique and of any suitable material, typically aluminum or steel. The components may be assembled in any order appropriate. The device is intended as a durable device and for use with multiple plates of different shapes and sizes, examples of which are shown in U.S. Patent Publication No. 2023/0057743 A1. The plate is illustrated with two legs, but the device is useful with any plate having at least one leg and wherein the device may be positioned to tension the at least one leg in accordance with the above.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A plate insertion tool for use with a compression plate having a plate body with one or more apertures each for receiving a screw and at least one leg at one end of the plate body, the plate insertion tool being usable to temporarily tension the legs prior to insertion into holes in a bone, the plate insertion tool comprising:
   a body;
   a pair of plate retainers at least one of which is movable with respect to the body over a range of travel between a clamping position and a fully open position, the plate retainers in use clamping a portion of the compression plate therebetween, the plate retainers being closer to each other in the clamping position as compared to the fully open position; and
   a pusher movable relative to the body over a range of travel between a fully disengaged position and a fully engaged position and positioned for engaging, in use, the compression plate such that when the pusher moves towards the fully engaged position the at least one leg of the plate is temporarily tensioned by bending the at least one leg away from the plate body,
   the body having a pivot joint about which said pusher pivots in moving over said range of travel between said fully disengaged position and said fully engaged position.

2. The plate insertion tool of claim 1, the plate retainers comprising a pair of facing, inwardly extending fingers each movable with respect to the body.

3. The plate insertion tool of claim 2, further comprising a first arm having one of the pair of inwardly extending fingers and a second arm having the other of the pair of inwardly extending fingers, the first and second arms being slidably mounted relative to the body for sliding relative to each other and the body.

4. The plate insertion tool of claim 3, wherein:
   the first arm has a first arm actuator at an end portion thereof opposite the one of the pair of inwardly extending fingers;
   the second arm has a second arm actuator at an end portion thereof opposite the other of the pair of inwardly extending fingers;
   the first arm actuator and the other of the pair of inwardly extending fingers being disposed on one side of the pusher and the second arm actuator and the other of the one of the pair of inwardly extending fingers being disposed on an opposite side of the pusher; and
   at least one spring disposed between the first arm actuator and the second arm actuator to bias the first arm actuator and the second arm actuator away from each other.

5. The plate insertion tool of claim 4, the first arm including a first arm slot and the second arm including a second arm slot, the body including at least one retention pin disposed in the first arm slot and limiting the range of travel of said first arm.

6. The plate insertion tool of claim 5, the body including at least a second retention pin disposed in the second arm slot and limiting the range of travel of said second arm.

7. The plate insertion tool of claim 1, including a shaft that translates relative to the body, said shaft forming a portion of a linkage converting translation of said shaft to pivoting motion of said pusher.

8. The plate insertion tool of claim 7, said pusher being disposed on a linking member and said shaft being pivotally connected to said linking member.

9. The plate insertion tool of claim 7, said shaft comprising a threaded leadscrew.

10. The plate insertion tool of claim 9, further comprising a rotatable handle having an interior threaded surface that engages the threaded leadscrew to cause rotation of the shaft relative to the body upon rotation of the handle.

11. The plate insertion tool of claim 10, the shaft having a transverse proximal capture pin and the handle having narrowing distal threading, whereby the handle is captured on said leadscrew.

12. An assembly comprising:
a compression plate having a body portion with one or more apertures each for receiving a bone screw and a pair of legs at one end that are each connected to the body portion of the plate and spaced apart by a shoulder; and
the plate insertion tool of claim 1 positioned to retain said plate for temporarily tensioning the legs of the plate.

13. The assembly of claim 12, the pusher engaging the shoulder of the plate.

14. The assembly of claim 12, the plate retainers comprising a pair of facing, inwardly extending fingers each movable with respect to the body and engaging the legs of the compression plate.

15. A plate insertion method comprising
providing an assembly including a plate insertion tool retaining a compression plate, the compression plate having a body portion with one or more apertures each for receiving a screw and at least one leg at one end connected to the body, the plate insertion tool comprising:

a pair of plate retainers at least one of which is movable with respect to the body over a range of travel between a clamping position and a fully open position, the plate retainers in use clamping a portion of the compression plate therebetween, the plate retainers being closer to each other in the clamping position as compared to the fully open position; and a pusher movable relative to the body over a range of travel between a fully disengaged position and a fully engaged position and positioned for engaging, in use, the compression plate, and the body having a pivot joint about which said pusher pivots in moving over said range of travel between said fully disengaged position and said fully engaged position;

moving the pusher towards the fully engaged position to cause the at least one leg of the plate to be temporarily tensioned by bending the leg away from the plate body;

screwing a bone screw through said at least one aperture;

inserting said at least one leg into a bone hole; and separating said plate insertion tool from said plate whereby bone or bone fragments are compressed.

16. The method of claim 15, wherein the plate has a pair of legs and wherein said pair of legs is inserted into respective bone holes.

* * * * *